United States Patent
Golan

[11] Patent Number: 5,974,549
[45] Date of Patent: Oct. 26, 1999

[54] SECURITY MONITOR

[75] Inventor: Gilad Golan, Ramat Hasharon, Israel

[73] Assignee: Soliton Ltd., Ramat Hasharon, Israel

[21] Appl. No.: 08/825,102

[22] Filed: Mar. 27, 1997

[51] Int. Cl.[6] .............................. G06F 12/14; G06F 13/00; G06F 15/00; G06F 11/00
[52] U.S. Cl. ............................................ 713/200; 714/47
[58] Field of Search .............................. 395/186, 187.01, 395/188.01, 200.09, 425, 500, 575, 600, 700; 713/200; 714/47

[56] References Cited

U.S. PATENT DOCUMENTS

| | | | |
|---|---|---|---|
| 5,263,147 | 11/1993 | Francisco et al. | 395/425 |
| 5,305,456 | 4/1994 | Boitana | 395/700 |
| 5,414,833 | 5/1995 | Hershey et al. | 395/575 |
| 5,483,649 | 1/1996 | Kuznetsov et al. | 395/186 |
| 5,524,238 | 6/1996 | Miller et al. | 395/600 |
| 5,603,014 | 2/1997 | Woodring et al. | 395/500 |
| 5,611,048 | 3/1997 | Jacobs et al. | 395/200.09 |
| 5,638,513 | 6/1997 | Ananda | 395/188.01 |
| 5,748,888 | 5/1998 | Angelo et al. | 395/186 |
| 5,764,889 | 6/1998 | Ault et al. | 395/186 |
| 5,768,503 | 6/1998 | Olkin | 395/187.01 |

OTHER PUBLICATIONS

Jeffrey Richter, Microsoft Systems Journal, May 1994.

*Primary Examiner*—Hassan Kizou
*Assistant Examiner*—Nguyen Xuan Nguyen
*Attorney, Agent, or Firm*—Darby & Darby

[57] ABSTRACT

The present invention is a method of creating a secure sandbox within which a plurality of downloaded software components can execute in a secure manner. The software components can be of any type, e.g., Java, ActiveX, Netscape plugin, etc. The invention implements a security monitor that is injected to the address space of an arbitrary monitored application such as a Web browser, e.g., Internet Explorer, Netscape Navigator, etc. The monitored application then executes in a secure mode in which every software component downloaded executes in a secure sandbox. The security monitor detects when such a software component is downloaded and is operative to create the sandbox around it before it is permitted to execute. If the software component attempts to commit an action that breaches security, it halts the software component's execution and issues a warning to the user. The security monitor detects attempted security breaches by the software component in accordance with a user configurable security policy. Such a policy may include limiting file read/write access, access to directories, disk access, creation and the reading/writing of network connections, access to system resources and services and access to the address spaces of other processes.

19 Claims, 14 Drawing Sheets

SECURITY MONITOR

FIELD OF THE INVENTION

The present invention relates generally to security software and more particularly relates to a security monitor for securing untrusted and/or unknown software downloaded from an external source.

BACKGROUND OF THE INVENTION

Recent developments in World Wide Web (the Web) technology have turned Web browsers from passive document viewers to active platforms for downloadable software components. In this new computing paradigm, software components are automatically and transparently downloaded from remote sites and executed locally as the user browses through Web documents. Today, such software components conform to either of two different standards: Java applets or ActiveX controls. In the future, however, additional standards may emerge.

An advantage of this new computing paradigm is that it offers a richness of features and capabilities. However, at the same time, it exposes Web users to alarming high security risks. Never before was there a scenario in which unknown software components were downloaded from remote locations and executed, sometimes without the user even being aware of it. This creates a huge security hole and an opportunity for introducing malicious software such as Trojan horses into a computer and any network it is connected to. Since the computer is connected to a network such as the Internet, this security hole can serve as a means for carrying out information theft. For example, a downloaded component can collect sensitive data and transmit it over the Internet to competitors or criminals.

These security implications are known and different approaches have been taken to solve them. The Java programming language and environment were designed from the ground up with security in mind. Java applets execute in what is termed a secure 'sandbox,' which is a run time environment in which applets are prevented from executing certain actions. For example, Java applets are not permitted to access local storage, modify system parameters or to establish a network connection to an untrusted site.

However, ActiveX controls, unlike Java, are composed of native Windows code and enjoy the same access privileges as any other Windows application. Thus, they have the same full access privileges that the currently logged in user has. This includes, for example, file and disk access, creating and accessing network connections and making system modifications.

A solution to these security related problems has been proposed which makes use of a system of authenticated certificates. The authenticated certificates are encrypted electronic signatures issued by trusted organizations which serve to identity the source of the downloaded ActiveX control. This mechanism enables the user to decide whether to trust the software author and permit the downloaded ActiveX control to run on their computer.

Although the authentication system somewhat relieves the security problem, it falls far short of providing an adequate and robust solution. As a security mechanism, it does little more than simply advise the user as to the identity of the software author. Anyone can obtain an electronic certificate, and having one only certifies the author's identity. It does nothing to verify their trustworthiness.

In addition, such a security system is also biased towards larger software authors and vendors because people are more apt to be familiar with and trust them. Thus, small vendors and little known individual software authors are discriminated against. This is in sharp contrast with the intention that the emergence of component technologies, e.g., ActiveX, Java, would foster a more specialized industry segmentation whereby numerous small but highly specialized software vendors would supply reusable components to be integrated into applications by high level solution providers.

SUMMARY OF THE INVENTION

The present invention is a method of creating a secure sandbox within which a plurality of downloaded software components can execute in a secure manner. The software components can be of any type, e.g., Java, ActiveX, Netscape plugin, etc. The invention implements a security monitor that is injected to the address space of an arbitrary monitored application such as a Web browser, e.g., Internet Explorer, Netscape Navigator, etc. The monitored application then executes in a secure mode in which every software component downloaded executes in a secure sandbox. The security monitor detects when such a download of a software component occurs and is operative to create the sandbox around it before it is permitted to execute. If the software component attempts to commit an action that breaches security, it halts the software component's execution and issues a warning to the user.

In the case of a modem Web browser such as Internet Explorer, the invention is operative to run the Web browser in a monitored environment by creating a secure sandbox around downloaded ActiveX controls. The secure sandbox enables downloaded ActiveX software controls to run within limitations derived from a user configurable security policy. Such limitations include limiting file read/write access, access to directories, disk access, creation and reading/writing network connections, access to system resources and services and access to the address spaces of other processes.

There is therefore provided in accordance with the present invention a method of monitoring the execution of a software component associated with an application in accordance with a predetermined security policy, the method comprising the steps of intercepting application programming interface (API) calls issued by the software component, blocking intercepted API calls that are forbidden according to the security policy, and allowing intercepted API calls that are permitted according to the security policy.

The step of intercepting comprises the steps of injecting a security monitor into the address space of the application, and redirecting the preselected set of API calls issued by the software component to the security monitor. The step of blocking intercepted API calls comprises the step of blocking intercepted API calls that are in the preselected set of APIs. The step of allowing intercepted API calls comprises the step of allowing intercepted API calls that are in the preselected set of APIs.

There is also provided in accordance with the present invention a method of monitoring the execution of a software component associated with an application in accordance with a predetermined security policy, the method comprising the steps of intercepting a preselected set of application programming interface (API) calls issued by the application, intercepting non-API calls issued by the software component, determining whether an intercepted API call issued by the application originated from a non-API call issued by the software component, blocking intercepted API calls that originated with a non-API call from the software component that are forbidden according to the security policy, and allowing intercepted API calls that originated with a non-API call from the software component that are permitted according to the security policy.

The step of intercepting a preselected set of API calls issued by the application comprises the steps of injecting a security monitor into the address space of the monitored application, and redirecting the preselected set of API calls issued by the application to the security monitor. The step of intercepting non-API calls issued by the software component comprises the steps of injecting a security monitor into the address space of the monitored application, and redirecting the non-API calls issued by the software component to the security monitor.

There is further provided in accordance with the present invention a method of monitoring the execution of a software component associated with an application in accordance with a predetermined security policy, the method comprising the steps of injecting a security monitor into the address space of the application, generating a plurality of stub functions corresponding to application programming interface (API) calls and non-API functions which are called by the software component, redirecting API calls and non-API calls made by the software component, redirecting API calls made by the application to the security monitor, setting a flag with each call made by the software component, redirecting a portion of API calls received by the plurality of stub functions to the security monitor, redirecting the non-API calls made by the software component to their corresponding non-API functions, and applying the predetermined security policy to an API call when the flag is set.

In addition, there is provided in accordance with the present invention a method of monitoring the execution of a software component associated with an application in accordance with a predetermined security policy, the method comprising the steps of applying interception to the application including all its modules whether loaded initially or during execution thereof, detecting the loading of a software component external to the application, applying interception to all calls made by the software component to functions located in other modules, and applying the security policy to the calls made by the software component.

There is also provided in accordance with the present invention a method of monitoring the execution of a software component associated with an application in accordance with a predetermined security policy, the method comprising the steps of applying interception to the application including all its modules whether loaded initially or during execution thereof, detecting the loading of a software component external to the application, applying interception to all calls made by the software component to functions located in other modules, and setting a flag when a call is issued by the software component to any function located in another module, applying interception to API calls contained in a preselected set, and applying the security policy to an API call when the flag is set.

BRIEF DESCRIPTION OF THE DRAWINGS

The invention is herein described, by way of example only, with reference to the accompanying drawings, wherein.

DETAILED DESCRIPTION OF THE INVENTION

The present invention is a method of creating a secure sandbox within which every downloaded software component, e.g., Java, ActiveX, Netscape plugin, etc., can execute in a secure manner. The invention implements a security monitor that is capable of running any Web browser, e.g., Internet Explorer, Netscape Navigator, in a secure mode in which every downloadable component executes within a secure sandbox. The security monitor detects when a downloaded software component attempts to commit an action that breaches security and functions to halt the component's execution and issue a warning to the user.

Figure 1:
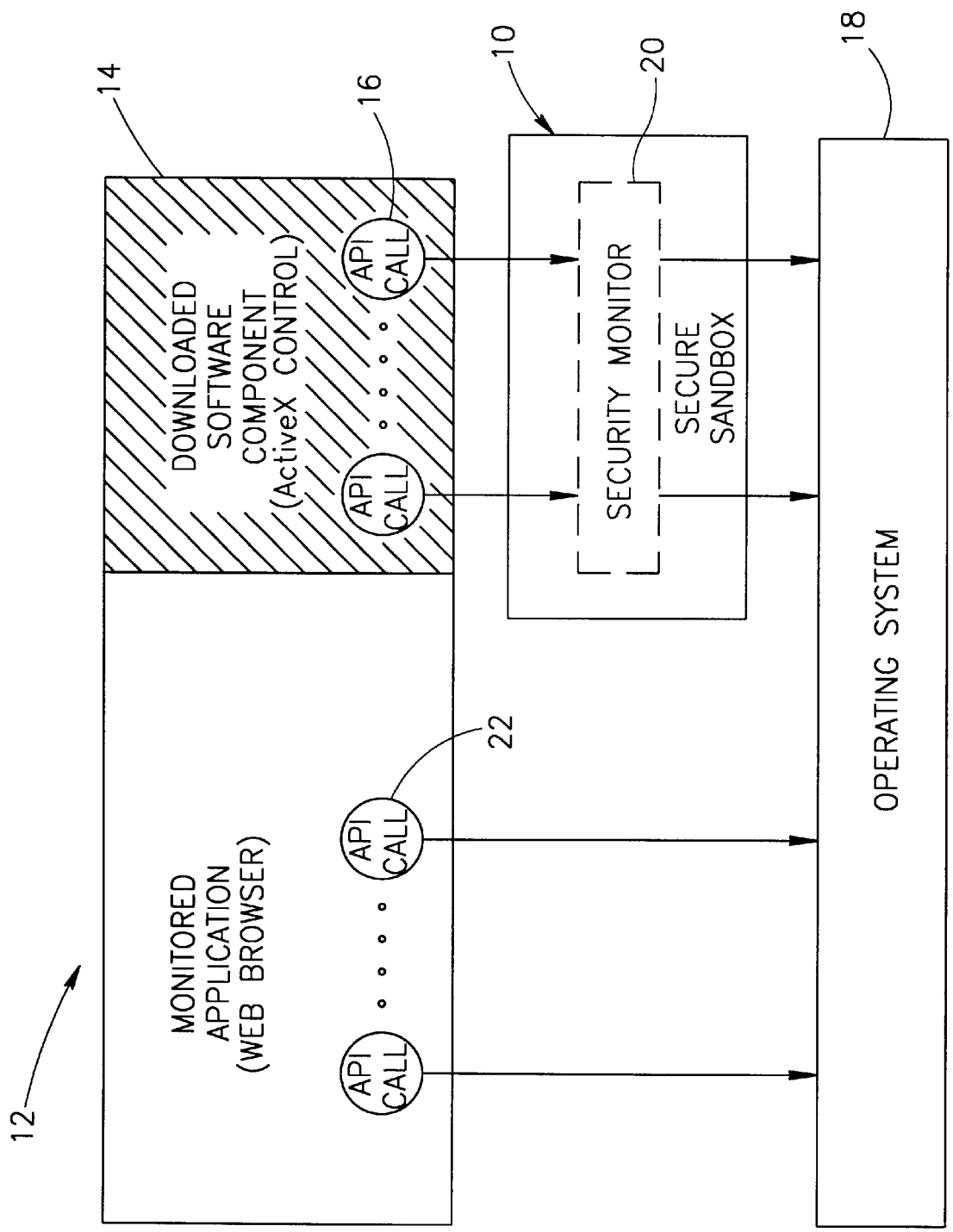
FIG. 1 is a high level block diagram illustrating the secure sandbox and security monitor of the present invention intercepting API calls issued from the downloaded software component within a monitored application.

A high level block diagram illustrating the secure sandbox and security monitor of the present invention intercepting API calls issued from the downloaded software component within a monitored application is shown in FIG. 1. The monitored application 12, i.e., a Web browser such as Internet Explorer, is shown with a software component, such as an ActiveX control, that was downloaded from an external source such as the Internet. The external source may be untrusted and/or unknown to the user. The monitored application normally makes API calls 22 to the operating system 18. The operating system may comprise Windows 95 or Windows NT, for example. The software component also issued API calls 16, however, these calls are intercepted and monitored by security monitor 20 within the secure sandbox, generally referenced 10. The security monitor does not permit the software component to call certain APIs with certain parameters that would breach the security configuration provided by a user. Once the security monitor filters the API, it may or may not issue a corresponding call to the operating system.

For example, in the case of a modern Web browser such as Internet Explorer, the invention runs the Web browser in a secure sandbox created around downloaded ActiveX controls. The secure sandbox enables untrusted ActiveX controls downloaded from the Internet to run within security limitations derived from a user configurable security policy. Such limitations include limiting access to file read/writes, access to directories, access to disk storage, the creation, reading and writing of network connections, access to system resources and services and access to the address spaces of other processes.

As used throughout this document, references to Windows refers to the Windows 95 and/or Windows NT operating systems unless specifically indicated. Note, however, that the invention is not limited to operation within the Windows operating system. The invention can be implemented in any modern operating system that supports (1) virtual memory wherein each application executes within its own full address space and (2) hardware abstraction wherein applications cannot access hardware directly and must go through operating system services in order to access hardware.

The secure sandbox security method of the present invention is based on two principles. The first principle is that in an operating system that supports virtual memory and hardware abstraction, a software component can only breach security by calling a system call, termed an API call in Windows terminology. Windows provides access to all its operating system services through more than-a thousand API functions. These APIs cover areas such as graphic output, disk and file access, networking services, system modifications, etc. Without making system calls, a software component can only modify memory within its own address space, which ceases to exist after the executable is terminated. These memory locations are, however, within its own address space and are thus separated from memory addresses of all other processes. Therefore, they have no persistent effects. In addition, the software component cannot access hardware, access local file and disk storage, modify system parameters, access the network, access e-mail and scheduling services, access other processes or establish unauthorized network connections without making API calls. Thus, to inflict any damage or breach security or confidentiality, a software component must issue one or more API calls.

The second principle of the present invention is that by monitoring a subset of the APIs issued by a software component, a security monitor can detect and prevent any attempt by the software component to breach security. The subset of APIs includes APIs that involve disk and file I/O, establishment of network connections, queries and/or modifications to system configuration, access to the memory space of other processes, access to e-mail, etc.

By monitoring all calls issued by a downloadable software component to a subset of the Windows APIs, the security monitor creates a virtual sandbox within which the component is permitted to execute freely while enforcing compliance with a predefined set of security rules.

The secure method of the invention comprises two major components. The first component is the security monitor which can be implemented as a Windows Dynamic Link Library (DLL). The second component is a security monitor injector which is used to 'inject' the security monitor DLL into the address space of the monitored application and subsequently activate it.

Figure 2:
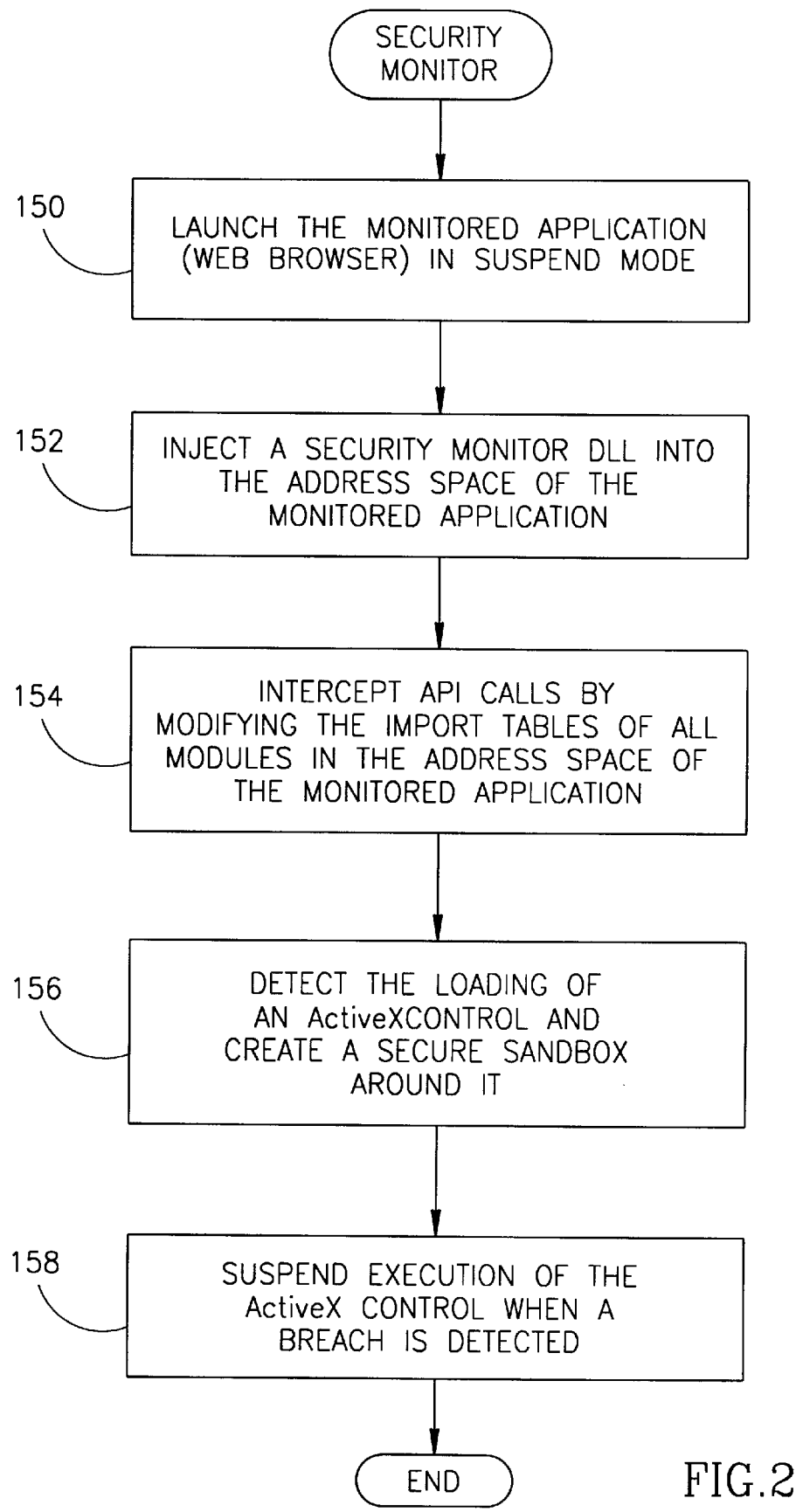
FIG. 2 is a high level flow diagram illustrating the security monitor method of the present invention.

A high level flow diagram illustrating the major stages or steps of the security monitor method of the present invention is shown in FIG. 2. The first step is to launch the application to be monitored, e.g., the Web browser, in suspended mode (step 150). Once the monitored application is launched, a monitor DLL, i.e., the security monitor, is injected into the address space of the monitored application (step 152). The monitor DLL or security monitor, in its initialization code, functions to modify the import tables of all modules within the monitored application's address space so as to intercept a specific set of API calls (step 154). Once API interception is in place, the security monitor detects the loading of a software component, e.g., ActiveX control, and creates a secure sandbox within which the component executes (step 156). If a security breach is detected, the security monitor suspends execution of the component and notifies the user accordingly (step 158).

When implemented, the secure monitor method of FIG. 2 is transparent to the user of the monitored application, the monitored application itself and the operating system. In addition, the method is non intrusive in that no modifications need be made to any component of the operating system or the monitored application. Further, the method's effect on performance is on average less than 1% which is virtually negligible.

The security monitor DLL is attached to the monitored application or browser upon the invocation of the browser, after which the browser is activated. The security monitor uses a method of API interception to implement the security profile or model as specified by a user. The API interception method, described in more detail hereinbelow, is applied to each module separately and can be configured to intercept any Windows API. A module is defined as an image of the program code and data contained in one DLL or EXE file and loaded into the address space of the running process.

Upon interception, the security monitor DLL can examine the parameters passed to the API function, perform additional processing, call the targeted API function, examine its return value and return program control to the application.

The security monitor DLL operates in two phases. The first phase occurs when no downloadable software component is executing. In this phase, the security monitor DLL intercepts only those APIs that function to load and execute a downloadable software component and those APIs that load additional modules into memory. All other APIs are called with no intervention. When the monitored application, i.e., the browser, attempts to load and execute a downloadable software component, the associated API is intercepted and the next phase is carried out.

The second phase functions to create a secure sandbox within which a downloadable software component can execute. When the security monitor DLL intercepts and traps an attempt to load and execute a downloadable software component, it permits the browser to load it as a separate module as it would normally. The secure monitor DLL, however, constructs a secure sandbox that monitors all the APIs that can be used to breach security, e.g., file and disk access, system modifications, network connections, etc. Whenever such an API is called directly or indirectly by the downloadable software component, the secure monitor DLL determines whether a security breach is being attempted. This determination is based on the API called, the parameters passed to it and a user configurable security policy.

There are APIs that should not be called by a downloadable software component at all, for example, the APIs used to shut down the system or those that can penetrate the address space of other processes. Other APIs may be permitted with certain limitations on their parameters. For example, APIs for opening files should not be permitted to be called except when opening files in certain designated directories in accordance with the security policy. If the security monitor DLL identifies such a security breach, it is operative to suspend execution and can issue a warning to the user describing the nature of the security breach. The user can then decide whether to terminate the downloadable software component or allow it to continue executing.

Figure 3:
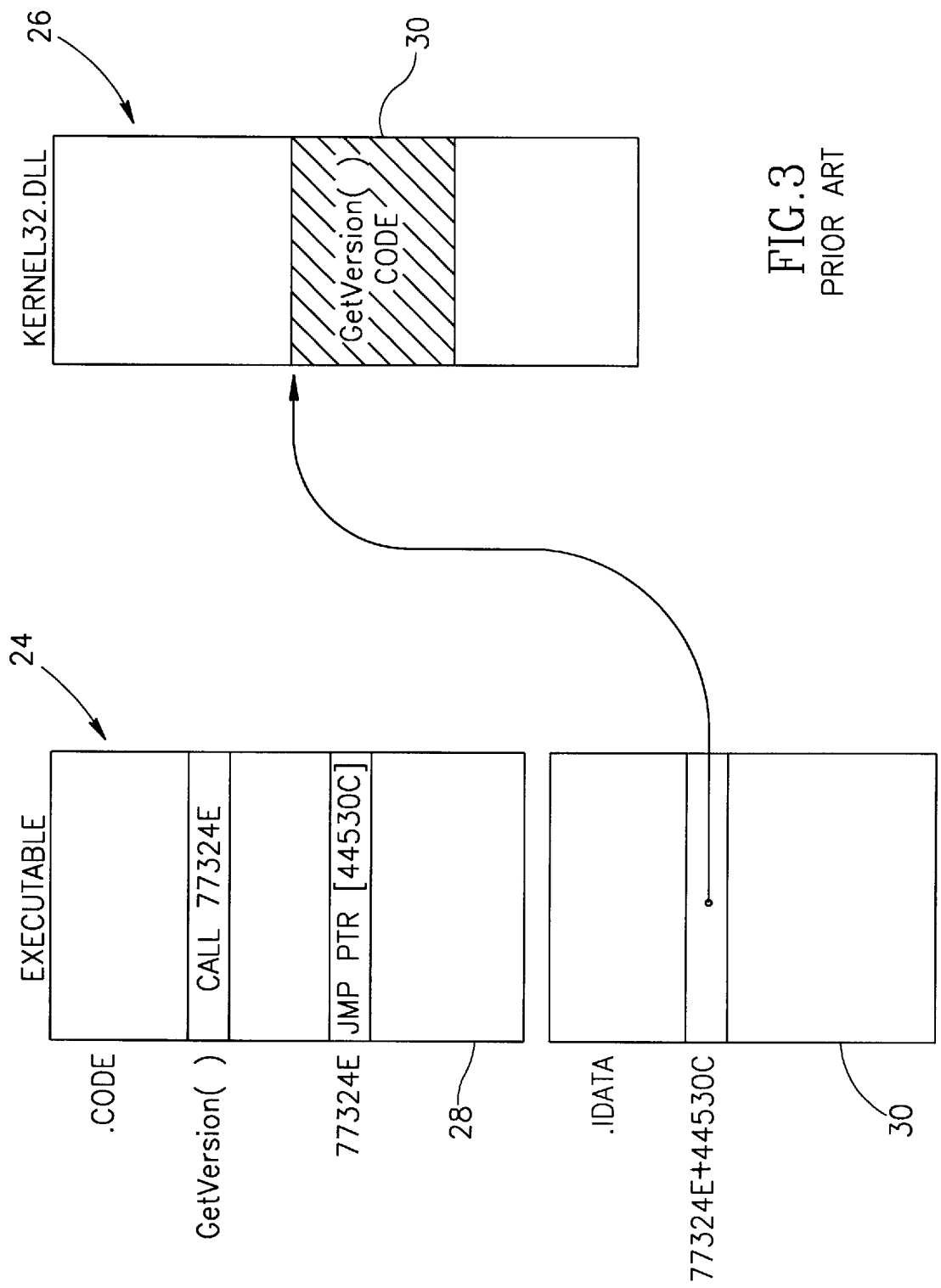
FIG. 3 is a memory representation illustrating the prior art mechanism of calling a system API.

To better illustrate the principles of the present invention, it is helpful to understand how APIs are normally called within a modern operating system such as Windows. A memory representation illustrating the prior art mechanism of calling a system API is shown in FIG. 3. The memory image of an executable is shown with its .CODE section 24 and its import table .IDATA section 30. As an example, the code within the executable includes a call to the API function GetVersion(). At compile time, jump table entries were created for holding jump pointers into the import table. The import tables are populated at run time with the actual addresses of the API functions in the system DLLs, such as kernel32.dll 26. The code for API function GetVersion() is indicated in FIG. 3 at 30. During execution of the executable program, a call is issued to the jump table as CALL 77324E. At address 77324E, a JMP PTR instruction is performed to combined address 77324E+44530C. This address references a location in the import table, i.e., .DATA, that holds the address of the GetVersion() API function in the kernel.

This indirect method of calling system APIs is used in order to permit efficient load time resolution of addresses.

Figure 4:
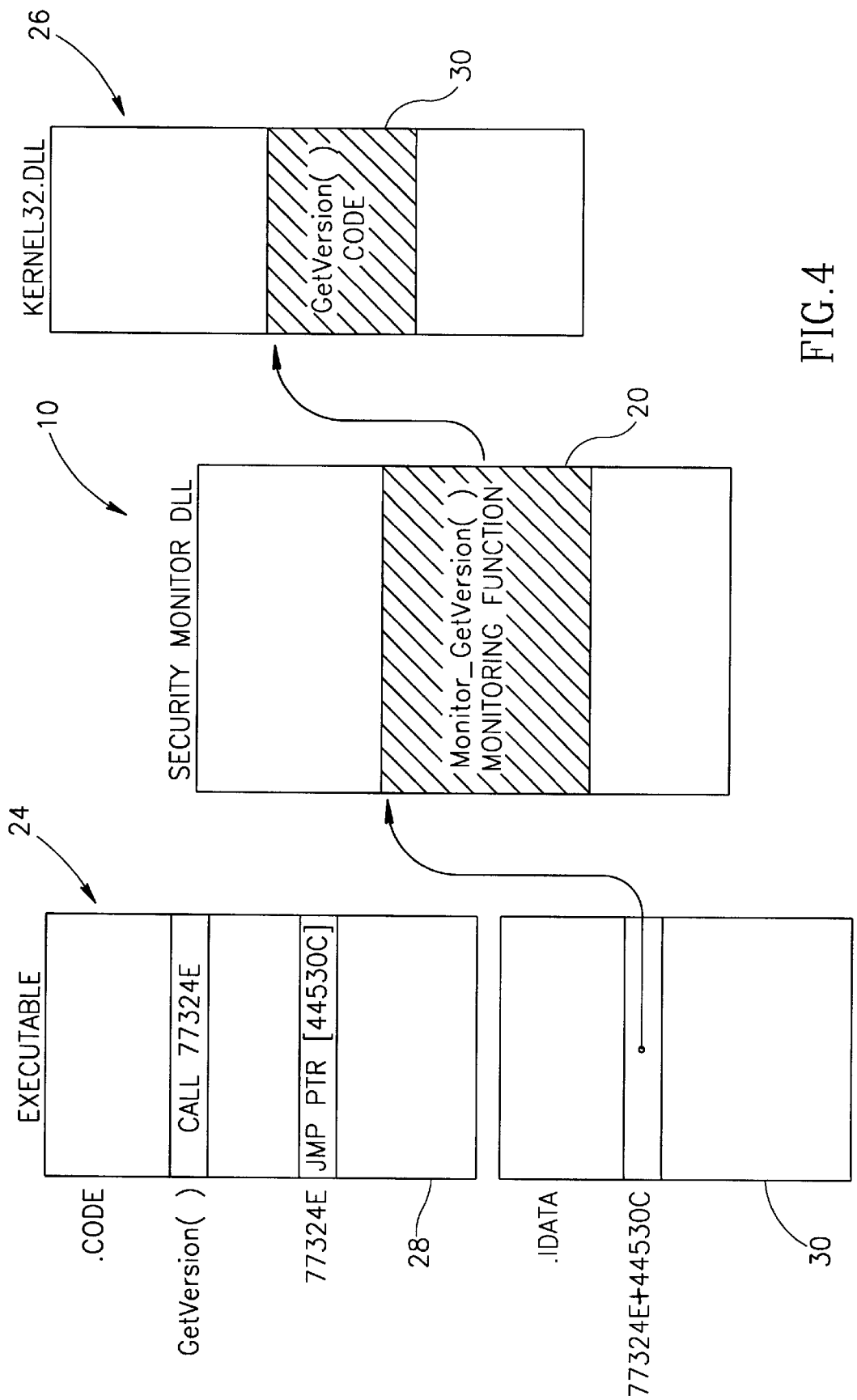
FIG. 4 is a memory representation illustrating the mechanism of calling a system API using the security monitor of the present invention.

Using the security monitor of the present invention, the API call mechanism is changed. A memory representation illustrating the mechanism of calling a system API using the security monitor of the present invention is shown in FIG. 4. The difference here is that the reference in the import table that used to point directly to the API function in the kernel, now points to a corresponding function in the security monitor DLL 10. Each system API that is to be intercepted has a separate security monitor routine associated with it. Thus, in the example shown in FIG. 4, the call to the GetVersion() API function is steered to the Monitor_GetVersion() security monitor function 20. Subsequently, the actual system kernel GetVersion() API function 30 is called by the monitor function.

Injection of Security Monitor DLL

Figure 5:
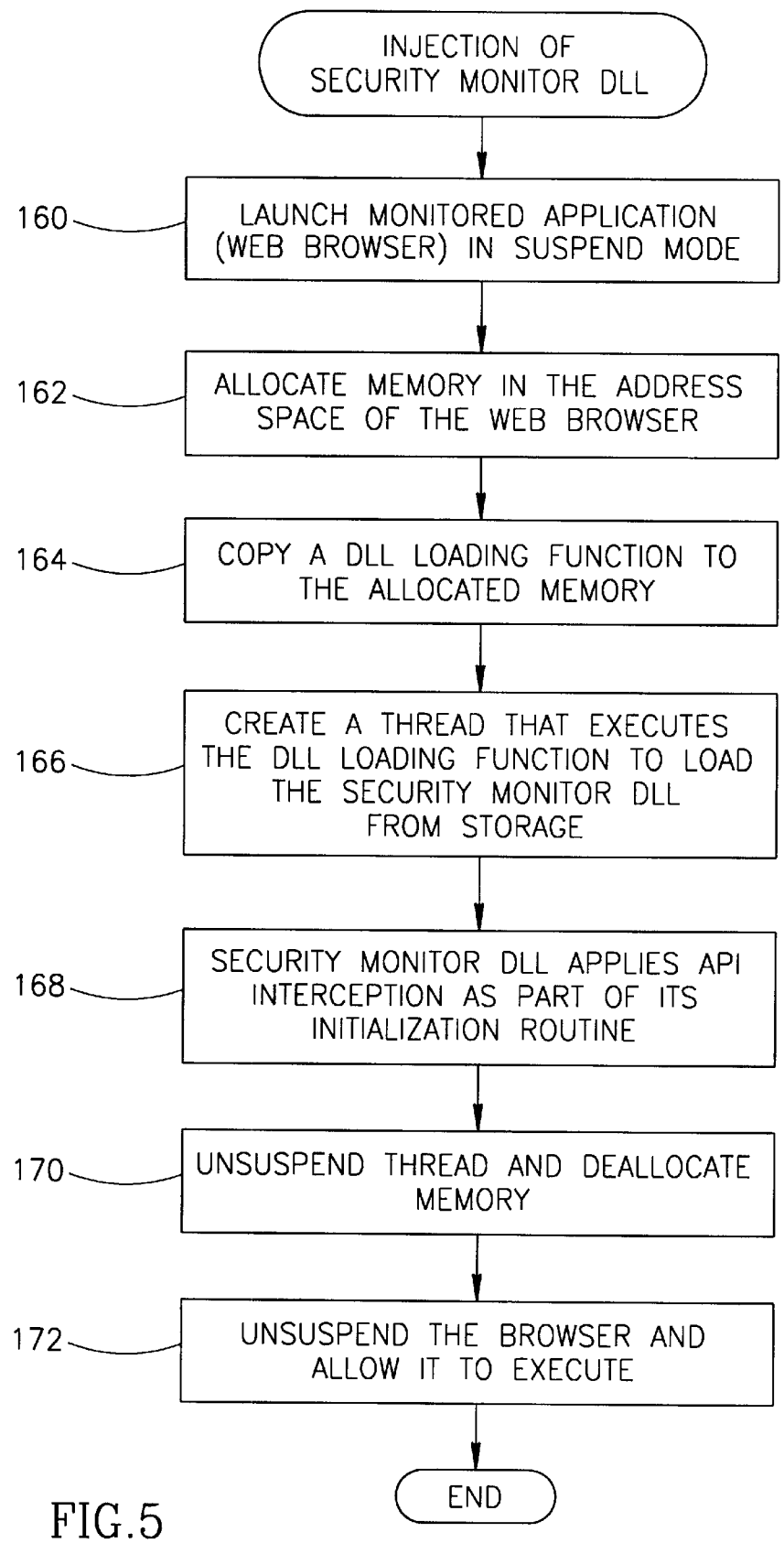
FIG. 5 is a high level flow diagram illustrating the method of injecting a DLL into the address space of the monitored application.

The method of injecting the secure monitor DLL into the monitored function will now be described in more detail. The method described here can be implemented on the Windows NT operating system platform. A high level flow diagram illustrating the method of injecting a DLL into the address space of the monitored application is shown in FIG. 5. As described previously, in order for the security monitor DLL to operate properly, it must execute within the address space of the monitored application, i.e., the browser. This requirement is due to the fact that the both Windows 95 and Windows NT support virtual memory whereby a process external to the browser cannot, under normal circumstances, access memory belonging to the browser process. An injection method is used to load it into the address space of the browser without the need to re-link or modify the browser in any way. By injecting the security monitor DLL into the address space of the browser, the functionality of the monitor can be combined with the functionality of the browser, allowing its memory to be accessed by the monitor DLL.

To aid in understanding the method of FIG. 5, a series of figures is presented, FIGS. 6 to 10, to illustrate the principles thereof. The first step is to launch the application to be monitored, which may be the Internet Explorer Web browser, in suspend mode (step 160). The monitored application is launched in suspend mode by calling the CreateProcess API and passing CREATE_SUSPEND as one of the creation attributes. When a process is started in suspend mode, the executable code and all the DLLs it imports are loaded into memory, however, execution is not begun until suspend mode is released.

Figure 6:
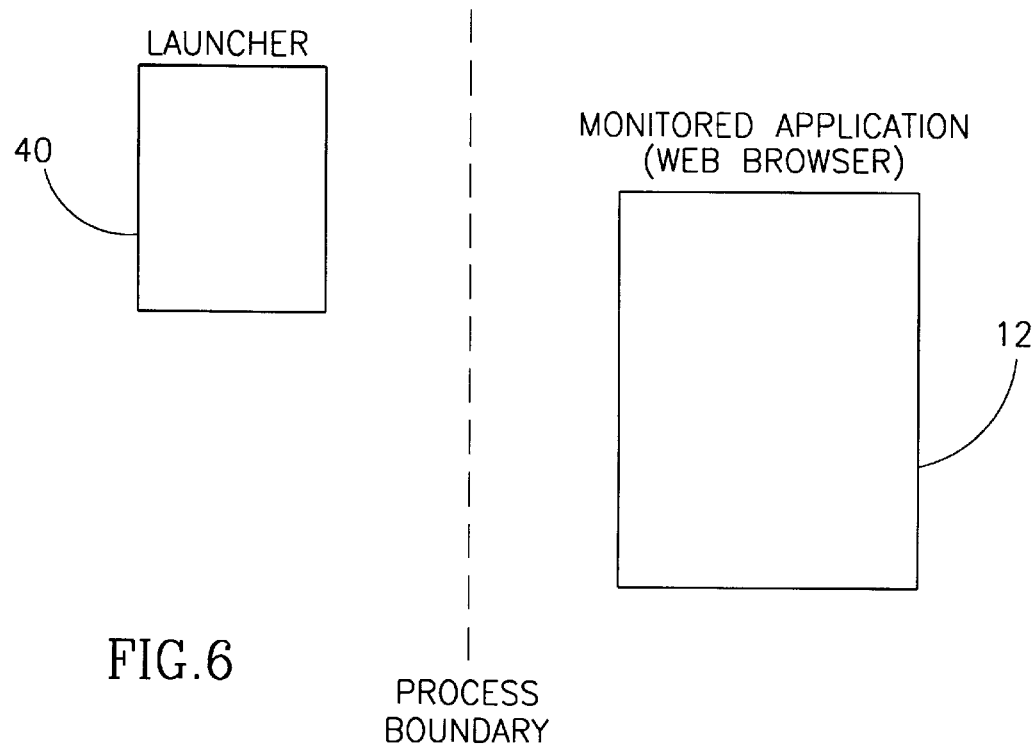
FIG. 6 is a high level block diagram illustrating the initial step of injecting the security monitor into the application to be monitored.

A high level block diagram illustrating the initial step of injecting the security monitor into the application to be monitored is shown in FIG. 6. The launcher 40, part of the software of the present invention, is operative to launch the Web browser 12 in suspend mode. Note that the launcher and the Web browser are separate by a clear process boundary.

Next, memory is allocated in the address space of the browser (step 162). The launcher utilizes the CreateRemoteThread API to allocate memory within the address space of the browser. The CreateRemoteThread API functions to create a thread in another process and by doing so, memory is allocated for the thread stack. Thus, memory is allocated by creating a thread in suspend mode and using the stack memory created for the thread.

Figure 7:
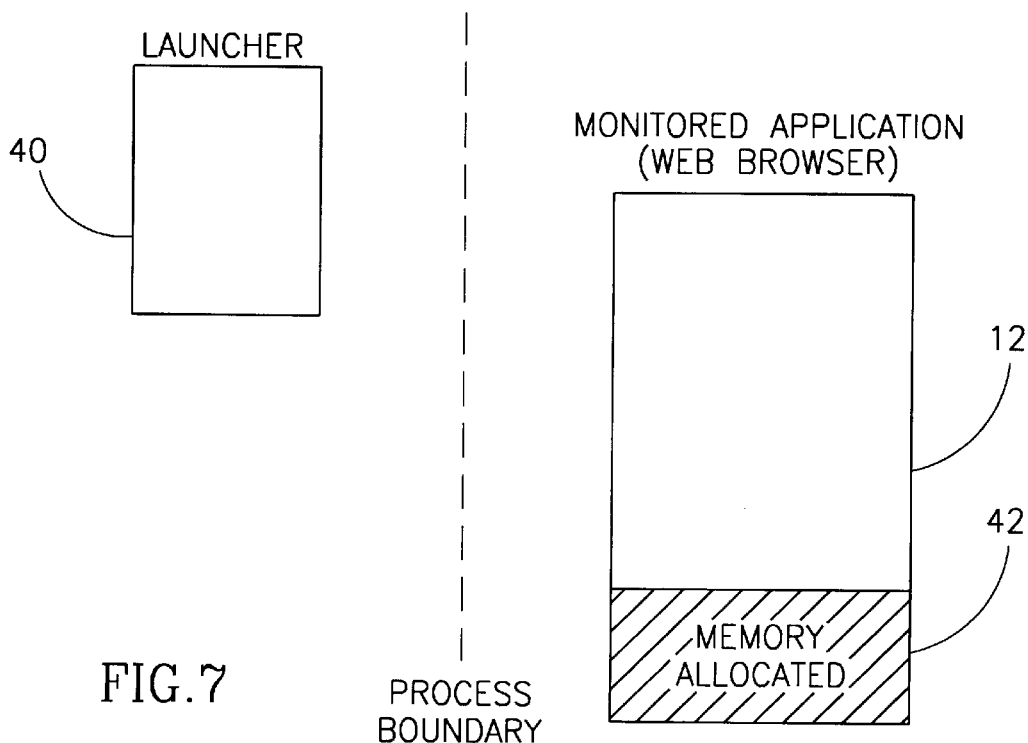
FIG. 7 is a high level block diagram illustrating the step of allocating memory within the application to be monitored.

A high level block diagram illustrating the step of allocating memory within the application to be monitored is shown in FIG. 7. The launcher 40 utilizes the CreateRemoteThread API to cause stack memory 42 to be allocated for the thread. Note that the memory is allocated within the memory address space of the browser 12.

Once memory is allocated, a DLL loading function is copied into the memory just allocated (step 164). The DLL loading function is contained within the launcher. The WriteProcessMemory API is used to copy the DLL loading function into the memory previously allocated within the address space of the browser.

Figure 8:
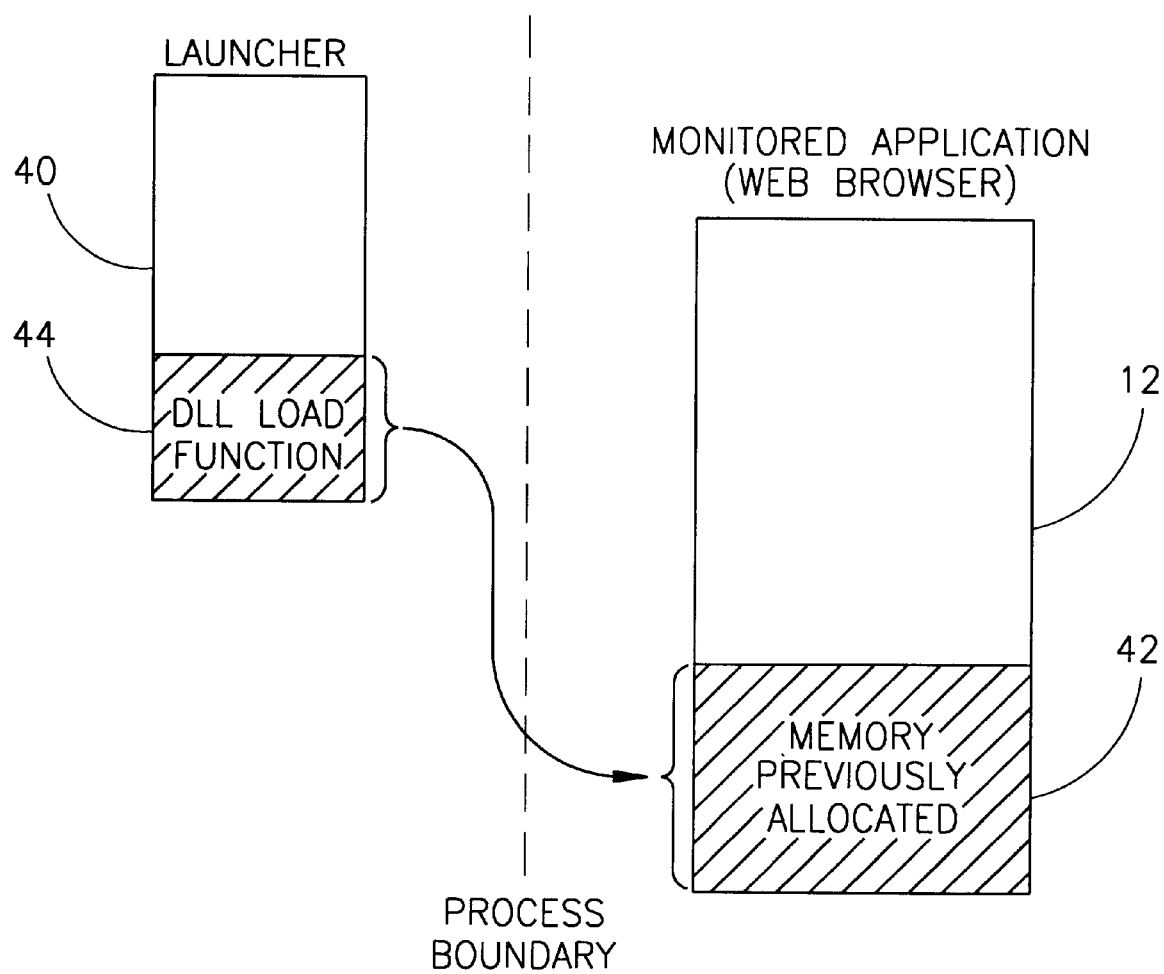
FIG. 8 is a high level block diagram illustrating the step of copying the DLL load function into the memory previously allocated within the application to be monitored.

A high level block diagram illustrating the step of copying the DLL load function into the memory previously allocated within the application to be monitored is shown in FIG. 8. The DLL loading function 44, within the launcher 40, is copied into the previously allocated memory 42 within the browser 12.

After the DLL load function is copied, a thread is created that executes the DLL loading function (step 166). The DLL loading function serves to load the security monitor DLL from disk storage. The thread is created in the browser's context and executes the DLL loading function. After the thread exits, the security monitor DLL resides in the browser's address space.

Figure 9:
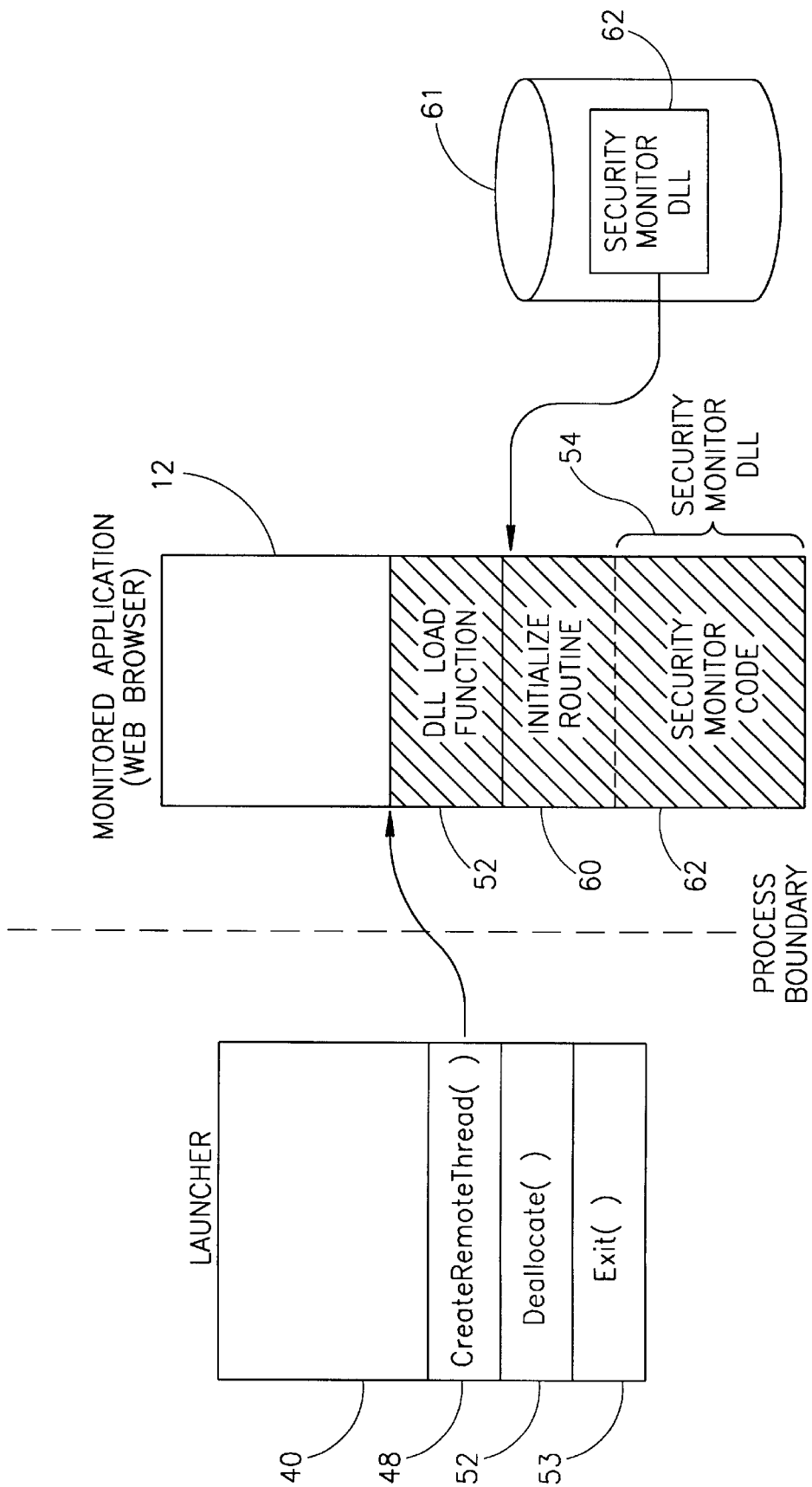
FIG. 9 is a high level block diagram illustrating the step of copying the monitor DLL from storage into the application to be monitored.

A high level block diagram illustrating the step of copying the monitor DLL from storage into the application to be monitored is shown in FIG. 9. The CreateRemoteThread API function 48 is called by the launcher 40 which runs the DLL load function 52 in the browser 12. The DLL load function loads the security monitor DLL 62 from storage 61.

Once the security monitor DLL is loaded, Windows calls its DLL initialization routine 60, as is done normally upon the loading of a DLL. The security monitor DLL initialization routine contains code that applies the API interception to selected APIs (step 168). Once initialization is complete, the API interception mechanism (described in more detail below) is in place and active. Control then returns to the CreateRemoteThread API. Subsequently, the initial memory allocated for the DLL load function is deallocated (FIG. 9 at 52) and the thread is unsuspended (step 170).

Once API interception is in place, the browser is unsuspended and permitted to begin execution (step 172). The browser is unsuspended using the ResumeThread API.

It is important to note that the method of injecting a DLL into the address space of the monitored application is only needed if such a mechanism is not provided by the particular operating system platform. Currently, there is no such mechanism built into the NT operating system platform, thus it is briefly described in this document. A more detailed description of how to inject a DLL into the context of an arbitrary process is presented in "Load Your 32-bit DLL into Another Process's Address Space Using INJLIB," Jeffrey Richter, Microsoft System Journal, May 1994, incorporated herein by reference.

The method described hereinabove for injecting a DLL into the address space of the browser will not function in Windows 95, as it relies on the CreateRemoteThread API, which is not available in Windows 95. Thus, when implementing the security monitor for the Windows 95 operating system platform, a different method should be used to inject the monitor DLL into the address space of the browser. Such a method may rely on the system hook mechanism provided by Windows, or may use the following registry entry: HKEY_LOCAL_MACHINE\Software\Microsoft\WindowsNT\CurrentVersion\Windows\APPINIT_DLLS This registry entry forces a DLL into the address space of any application.

Alternatively, the debugging APIs can be used to control the browser and inject the DLL into to its address space. A more detailed description of these methods can be found in "Learn System-Level Win32 Coding Techniques by Writing an API Spy Program," Matt Pietrek, Microsoft Systems Journal, December 1994.

Intercepting API Calls

The security monitor DLL uses an API interception based on the mechanisms provided by the Windows operating system for calling functions from other DLLs. Since every Window's API is available as a function in a system DLL, this method can be utilized to intercept all APIs that are called from an application.

With reference to FIGS. 2 and 3, when Windows executable modules contain calls to functions imported from other DLLs, the resulting code making up the module will contain indirect calls which are made through import tables that appear in the header of the module. As an example, the following simple C program is presented below.

```
intmain()
{
  GetVersion();
  GetVersion();
}
```

This C program functions to call the GetVersion API twice. GetVersion is a Windows API imported from the DLL 'kernel32.dll.' Based on this source program, a C compiler generates the following assembly code, for example:

823E30: CALL 0077324E
823E35: CALL 0077324E

.

.

.

77324E: JMP DWORD PTR[0044530C]

The CALL instructions do not go directly to the address of the GetVersion code in the kernel32.dll module. Rather, each CALL goes to a JUT statement within the module's code. The JMP instruction then jumps to the address found in offset 0x0044530C. Offset 0x0044530C points to the entry corresponding to the GetVersion API in an array of function addresses in a module section commonly known as .idata, i.e., import data. This array contains the addresses of all functions imported from external DLLs which are called by the executable. Note that the executable includes files having file extensions of .EXE, .DLL and .OCX. The function addresses are filled by the Windows operating system loader when the executable and any associated DLLs it imports are loaded from storage into memory. Thus, when the JMP instruction is executed, control passes to the code of the API function GetVersion.

In order to intercept API calls, the security monitor DLL scans the function address array in the import tables of the modules of the application to be monitored and replaces the addresses of all API functions that are to be intercepted with addresses provided by the security monitor DLL. Once interception is in place, the security monitor functions are then able to examine the parameters passed to the API, carry out further processing, store information about the state of various system resources, e.g., the handles of system objects and their properties, and finally call the actual API function. It is important to note that this process is completely transparent to the process that issues the API call.

This API interception method is utilized by the present invention to intercept two groups of API functions:

Group A: This group includes all the APIs needed to detect the loading of an ActiveX control or other downloadable software component and also includes those APIs that load additional DLLs. This includes three APIs: CoGetClassObject, LoadLibrary and LoadLibraryEx. The first API, CoGetClassObject, is the API used to load an instance of an ActiveX control, i.e., .OCX file. Modules loaded through these calls are marked as untrusted modules and must be monitored.

Group B: This group includes all the APIs that need to be monitored in order to detect security breaches. This includes all the APIs used for disk and file I/O, e-mail APIs, i.e., MAPI APIs, networking, modification of system configuration, i.e., registry APIs, and APIs that are used to access other processes running on the system.

A more detailed description of the API interception process can be found in "learn System-Level Win32 Coding Techniques by Writing an API Spy Program," Matt Pietrek, Microsoft System Journal, December 1994.

ActiveX Control Load Detection

At this point, the browser is running but no ActiveX control has been loaded yet. All calls issued by the browser to APIs that are in either Group A or B are intercepted by individual interception routines. The API calls to those APIs in Group A are intercepted in order to apply interception to any new modules loaded by the browser or to construct a sandbox around any software components, e.g., ActiveX controls, the browser loads in. For the API calls in Group B, however, since the browser itself is a trusted application, the interception routines simply call the real APIs. Thus, the security monitor DLL intercepts calls to APIs in Group A and does not interfere with calls made by and that originate from the browser that are found in Group B.

The security monitor will detect any attempt to load an ActiveX control into memory. Detection is accomplished by trapping the CoGetClassObject and LoadLibraryEx APIs in Group A. The following is a pseudo code snippet for the security monitor routines, i.e., interception routines, for the CoGetClassObject and LoadLibraryEx APIs.

```
Monitor_CoGetClassObject(params)
{
    LoadingControlFlag=TRUE; // mark beginning of loading
    ReturnValue=CoGetClassObject(params); // call the real API
    LoadingControlFlag=FALSE;
    return (ReturnValue); // pass the API return value to the application
}
Monitor_LoadLibraryEx(FileName)
{
    ModuleHandle=LoadLibraryEx(FileName); // call the real API
    if (LoadingControlFlag) // loading an ActiveX control
    {
        // create a secure sandbox for the ActiveX control
        ApplyAPIInterceptionToModule(ModuleHandle);
        CreateSandboxAroundModule(ModuleHandle);
    }
    else
        ApplyAPIInterceptionToModule(ModuleHandle);
    return (ModuleHandle);
}
```

The FileName indicated above refers to any DLL or file with an .OCX extension. The detection of the loading of an ActiveX control is accomplished by intercepting the three APIs CoGetClassObject, LoadLibrary and LoadLibraryEx. The API CoGetClassObject serves to initiate the process of loading an ActiveX control and the APIs LoadLibrary and LoadLibraryEx serve to load additional DLLs explicitly in addition to those imported by the browser code. When such calls are intercepted, API interception is applied to the loaded modules as well.

Figure 10:
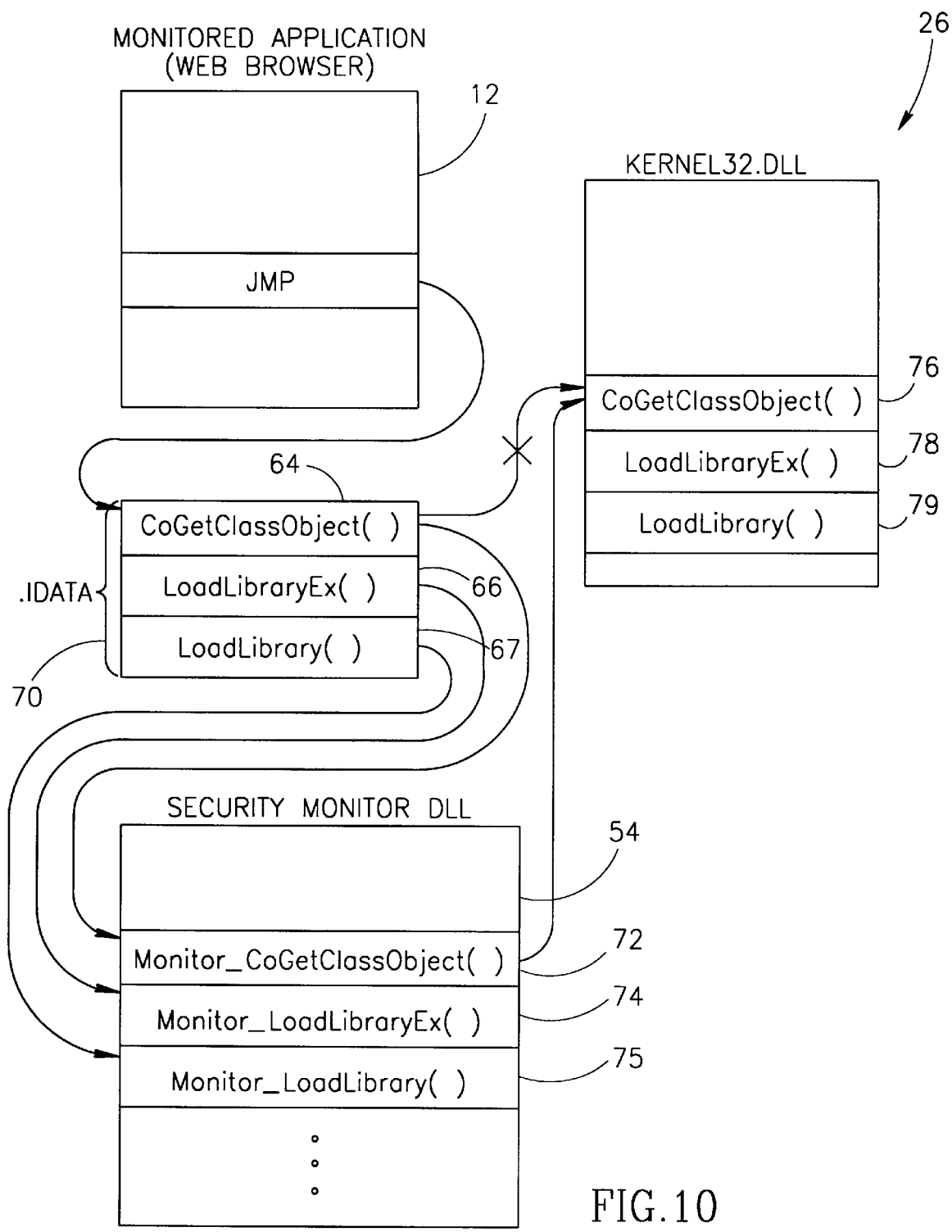
FIG. 10 is a high level block diagram illustrating the mechanism of detecting the loading of an external software component.

A high level block diagram illustrating the mechanism of detecting the loading of an external software component is shown in FIG. 10. Shown in the Figure are the monitored application or Web browser 12, the import data table or IDATA section 70, the security monitor DLL 54 and the system DLL kernel32.dll 26. The import table of the monitored application and all its modules loaded initially and during execution are modified so that API calls made to a preselected set of APIs are made to corresponding functions with the security monitor DLL. Accordingly, a call to CoGetClassObject() 64 is steered to the Monitor_CoGetClassObject() function 72, a call to LoadLibraryEx() 66 is steered to the Monitor_LoadLibraryEx() function 74 and a call to LoadLibrary() 67 is steered to the Monitor_LoadLibrary() function 75.

Each of the security monitor functions Monitor_CoGetClassObject(), Monitor_LoadLibraryEx() and Monitor_LoadLibrary(), in turn, calls the actual real API functions CoGetClassObject() 76, LoadLibraryEx() 78 and LoadLibrary() 79, respectively.

Sandbox Creation

Figure 11:
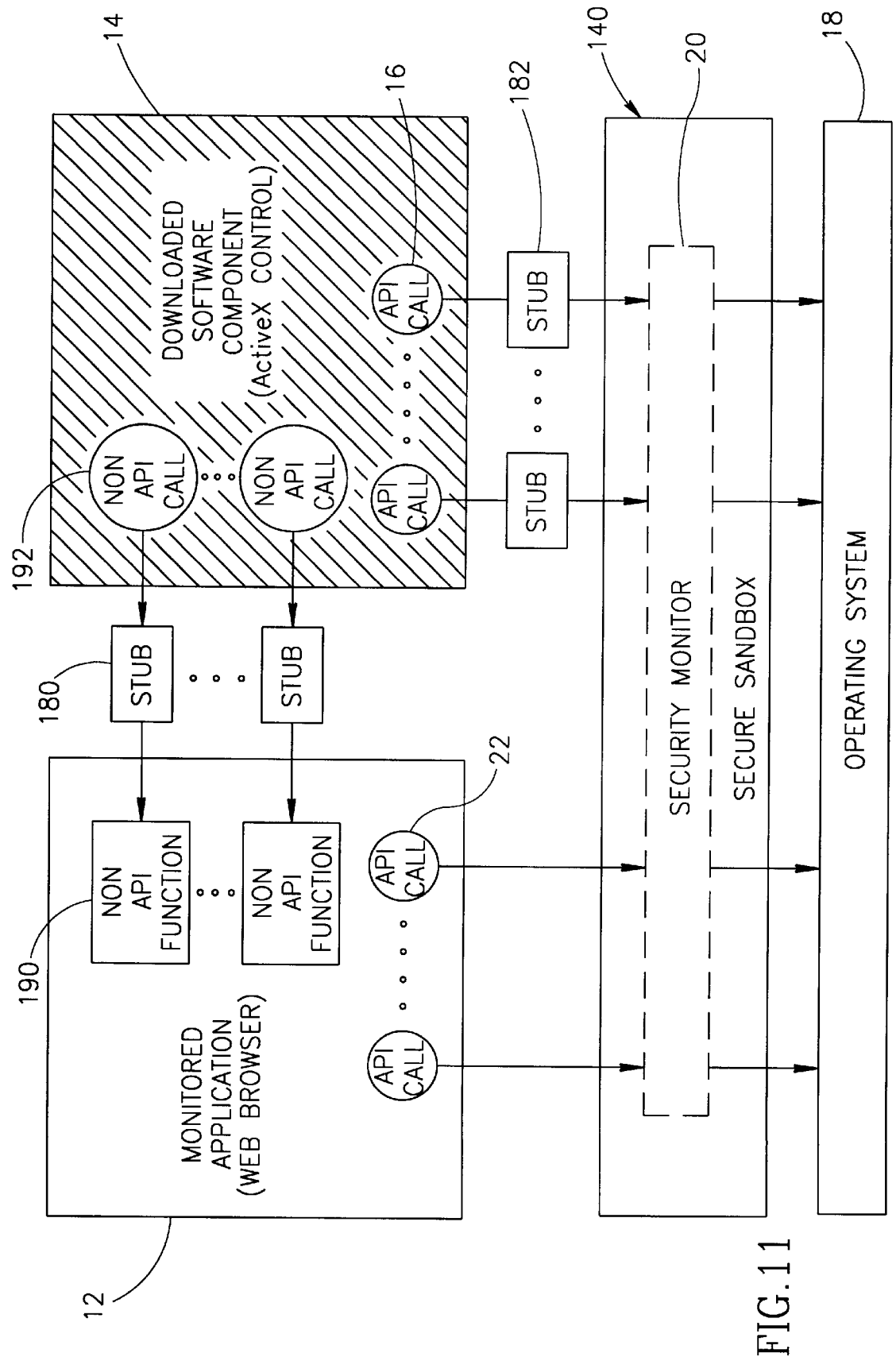
FIG. 11 is a high level block diagram illustrating the secure sandbox and security monitor of the present invention intercepting API calls issued from both the downloaded software component within a monitored application and from the monitored application itself.

A high level block diagram illustrating the secure sandbox and security monitor of the present invention intercepting API calls issued from both the downloaded software component within a monitored application and from the monitored application itself is shown in FIG. 11. As is described in more detail below, in order to implement the security monitor of the present invention in an operating system 18 such as the Windows 95 or NT operating system, API calls 22 that originate from the monitored application 12, i.e., the Web browser, must also be intercepted and monitored in addition to API calls 16 made from the software component 14. Further, non-API calls 192 made by the software component to non-API functions 190 in other modules of the monitored application are also intercepted by a plurality of stub functions 180, 182.

Once the ActiveX control is loaded, a secure sandbox 140 is created around it. The secure sandbox functions to monitor, using the security monitor 20, any call made to an API from Group B, described hereinabove, by the software component, i.e., the ActiveX control. Such a call can be made in either of two ways:

1. The API call is made directly by the ActiveX control.
2. The API call is made indirectly by a function in another module, i.e., DLL, that the ActiveX control calls. It is important to note that, in this case, the API call could be made from anywhere in the call chain that originated from the function called by the ActiveX control.

Calls made in both of the above ways must be trapped and monitored for security breaches since both ways may be used by the ActiveX control to breach security.

Figure 12:
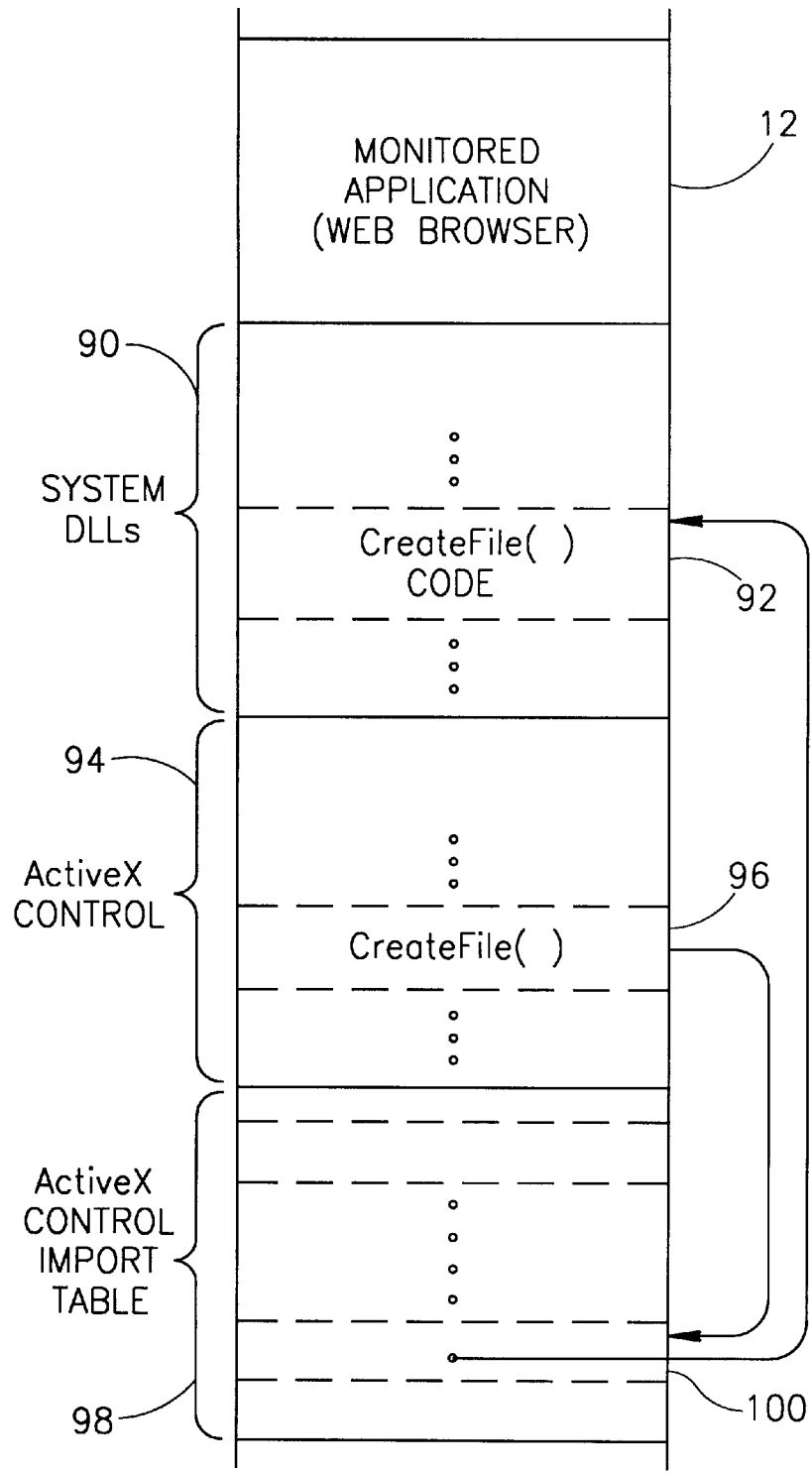
FIG. 12 is a memory representation illustrating the prior art mechanism of a software component directly calling a system API.

A memory representation illustrating the prior art mechanism of a software component directly calling a system API is shown in FIG. 12. Shown in the memory map are the monitored application 12, one or more system DLLs 90, the ActiveX control module 94 and the import data table for the ActiveX control 98. The software component 94, e.g., an ActiveX control, contains code that calls the API CreateFile 96. As described previously, the actual address of the CreateFile code 92 in the system DLL 90 is located in the import data table 98 associated with the ActiveX control (FIG. 12 at 100).

Figure 13:
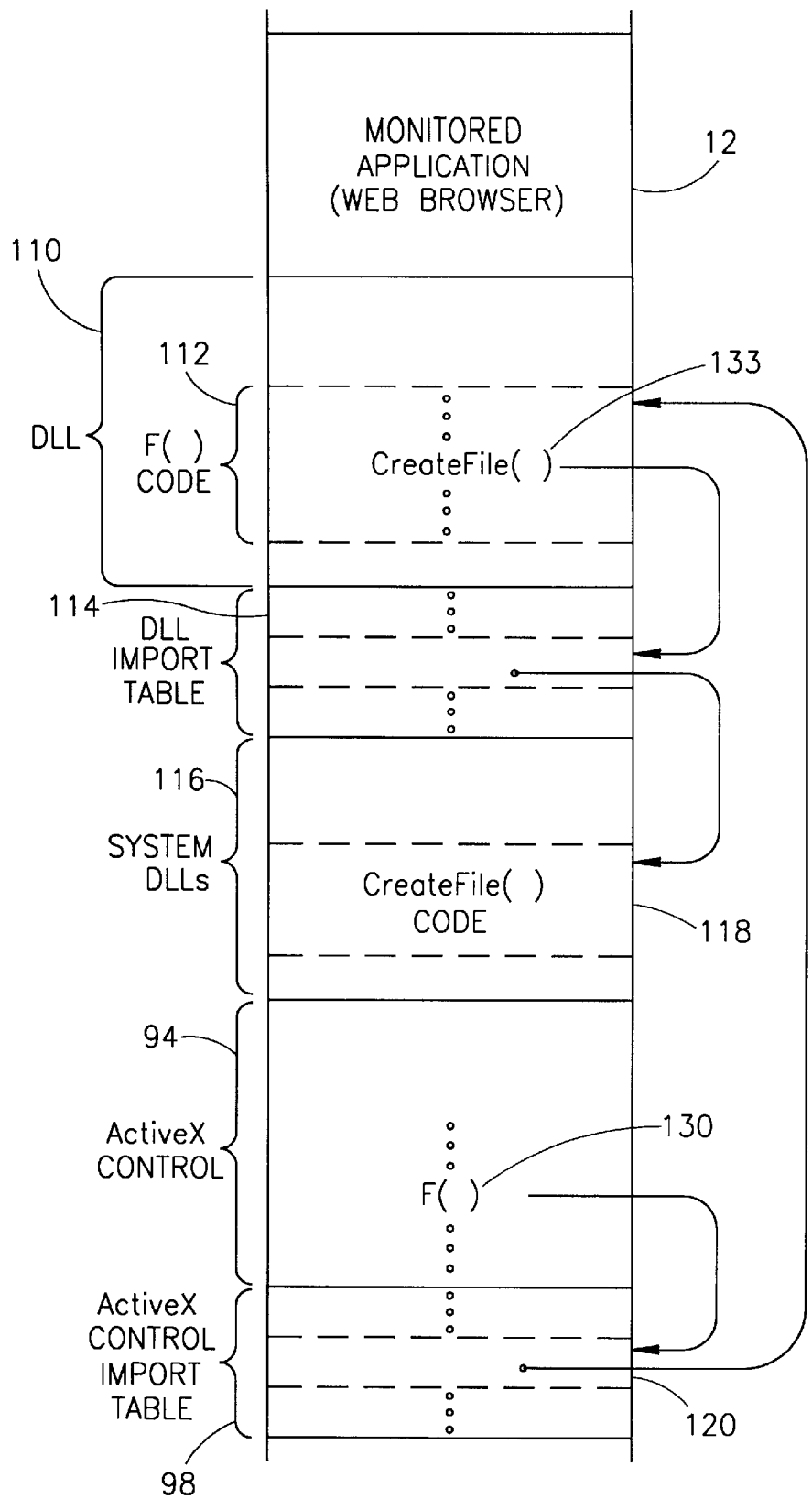
FIG. 13 is a memory representation illustrating the prior art mechanism of a software component indirectly calling a system API.

A memory representation illustrating the prior art mechanism of a software component indirectly calling a system API is shown in FIG. 13. Shown in the memory map are the monitored application or Web browser 12, a DLL module 110 associated with the Web browser, a function F() 112 within the DLL, the DLL related import data table 114, one or more system DLLs 116, the ActiveX control module 94 and the import data table for the ActiveX control 98. The software component 94, e.g., an ActiveX control, contains code that calls an arbitrary function F() (FIG. 13 at 130). As described previously, the actual address of the F() code 112 in the Web browser DLL 110 is located in the import data table 98 associated with the ActiveX control (FIG. 13 at 120). The address at 120 points to the F() code 112 in the DLL 110. The F() code, in turn, makes a call to the CreateFile API (FIG. 13 at 133). The address of the CreateFile API is gotten from the DLL import table 114. Thus, in this manner, an ActiveX control is able to circumvent a security monitor that only checks for calls made directly to system APIs.

The security monitor of the present invention is operative to trap and monitor for security breaches all calls to system API functions regardless of whether they are made directly or indirectly by the software component.

Calls Made Directly to API Functions

Trapping calls to APIs that are made directly by the ActiveX control can be accomplished utilizing the API interception method described above. Every API that is to be trapped, i.e., the APIs in Group B, has a security monitor interception function associated with it. Every call to an API from the ActiveX control must pass through a corresponding monitor function.

Figure 14:
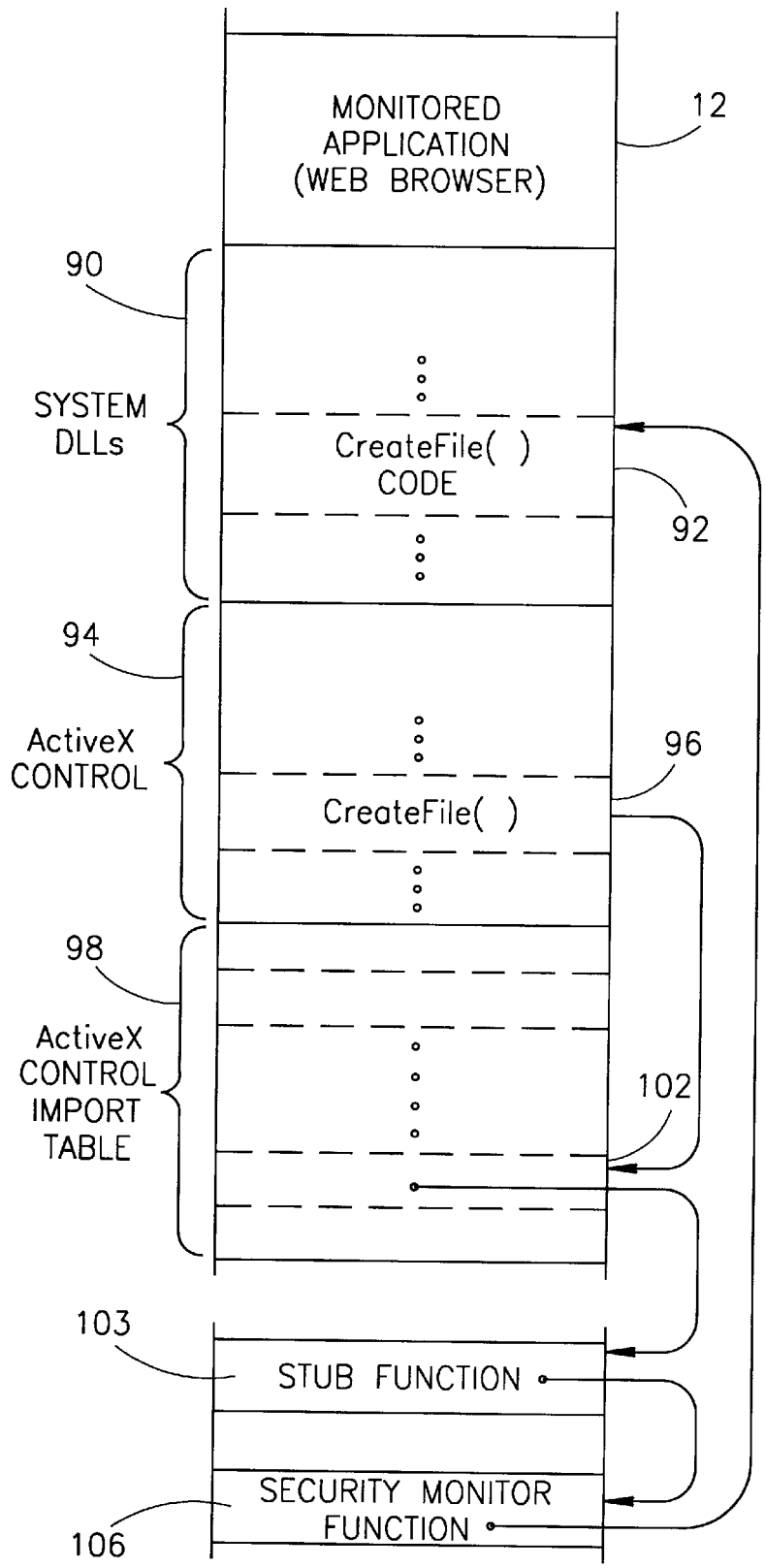
FIG. 14 is a memory representation illustrating the mechanism of a software component directly calling a system API using the security monitor of the present invention.

A memory representation illustrating the mechanism of a software component directly calling a system API using the security monitor of the present invention is shown in FIG. 14. The memory map shown in FIG. 14 shows the monitored application or Web browser 12, one or more system DLLs 90, software component 94, e.g., ActiveX control, its import table 98, stub function 103 and monitor function 106.

To illustrate the principles of the method of the present invention, the ActiveX control is shown issuing a call to the CreateFile API (FIG. 14 at 96). Calls to all other API functions are handled in a similar fashion. When the call is made, control is passed to a stub function 103 rather than the API function itself. The import data table of the ActiveX control is modified so as to point to the stub function (FIG. 13 at 102). Thus, any call made by the ActiveX control to an API function is directed to a stub function. The pseudo code for a stub function for the call to the CreateFile API is given below:

```
StubFunction_CreateFile()
{
    if (not Is_ActiveX_Control_Chain)
    // call chain was not marked yet as an ActiveX control
        call chain
    {
        // mark the call chain
        Is_ActiveX_Control_Chain=TRUE;
        // store the return address of the calling function
            which is
        // located on the stack
        Original_Return_Point=Get_Return_Address();
        // insert a return routine to trap the return from the
            call chain
        Replace_Return_Address_With
            (CommonReturnFunc);
    }
    // call the security monitor function associated with the
        particular API jump to Monitor_CreateFile;
}
```

In similar fashion a stub function is generated for each API call that is to be monitored in the ActiveX control at the time it is loaded. The pseudo code for the common return function is given below:

```
CommonReturnFunc()
{
    // clear the mark flag
    Is_ActiveX_Control_Chain=FALSE;
    // restore the original return function
    Set_Return_Function(Original_Return_Point);
    return;
}
```

The CommonReturnFunc is common for all stub functions. The common return function is needed because the call chain marking flag must be reset before control returns to the ActiveX control module. For this reason, the stub function modifies the return address so that when the API function returns, control passes to the common return function and not the ActiveX control. The common return function is responsible for swapping back the original return address within the ActiveX control.

Contained in the stub function is the address of the security monitor associated with that particular API function. The stub function sets the mark flag if it is not set already, stores the original return address of the calling function and replaces the return address with a return address pointing to the CommonReturnFunc. The stub function replaces the original return address with the address of the corresponding security monitor interception function.

Pseudo code for the monitor function associated with the CreateFile API is presented below.

```
Monitor_CreateFile(params)
{
    if (Is_ActiveX_Control_Chain)
    {
        // the call is part of an ActiveX call chain
        if (Security_Is_Breached);
        // based on the parameters and the security policy, a
            security
        // breach has occurred
        {
            Issue_Warning_To_User();
            if (User_Allows);
                continue execution;
            else
                abort;
        }
    }
    // call the real API
    return (CreateFile(params));
```

The security monitor function 106 tests if the Is_ActiveX_Control_Chain flag is set. If the flag is set, then the function call is part of a call chain that originated in the ActiveX control and should be monitored for security breaches. If the flag is not set, it indicates that the function call was issued from the browser code and can be trusted. In this case, the API call is permitted to be made without a security check.

If the flag is set, it is then determined whether security has been breached. This determination is made in accordance with the security policy that is configurable by the user. An attempt to breach security is found if the security policy does not permit the software component to call that particular API with the particular parameters passed to it. If configured, a warning can be issued to the user permitting her/him to choose whether to allow processing to continue or halt execution of the software component.

Calls Made Indirectly to API Functions

Trapping calls to APIs that are made indirectly by another module is accomplished using the following method. As previously described, this case involves a scenario whereby an ActiveX control calls a function F() in module X. In turn, function F() calls the API CreateFile. Permitting the ActiveX control to call the CreateFile API is a breach of security. The browser itself, however, calls such an API and indeed may do so numerous times. If all calls to the CreateFile API are trapped and prevented from being made, perfectly legal calls made by the browser itself will also be blocked.

Figure 15:
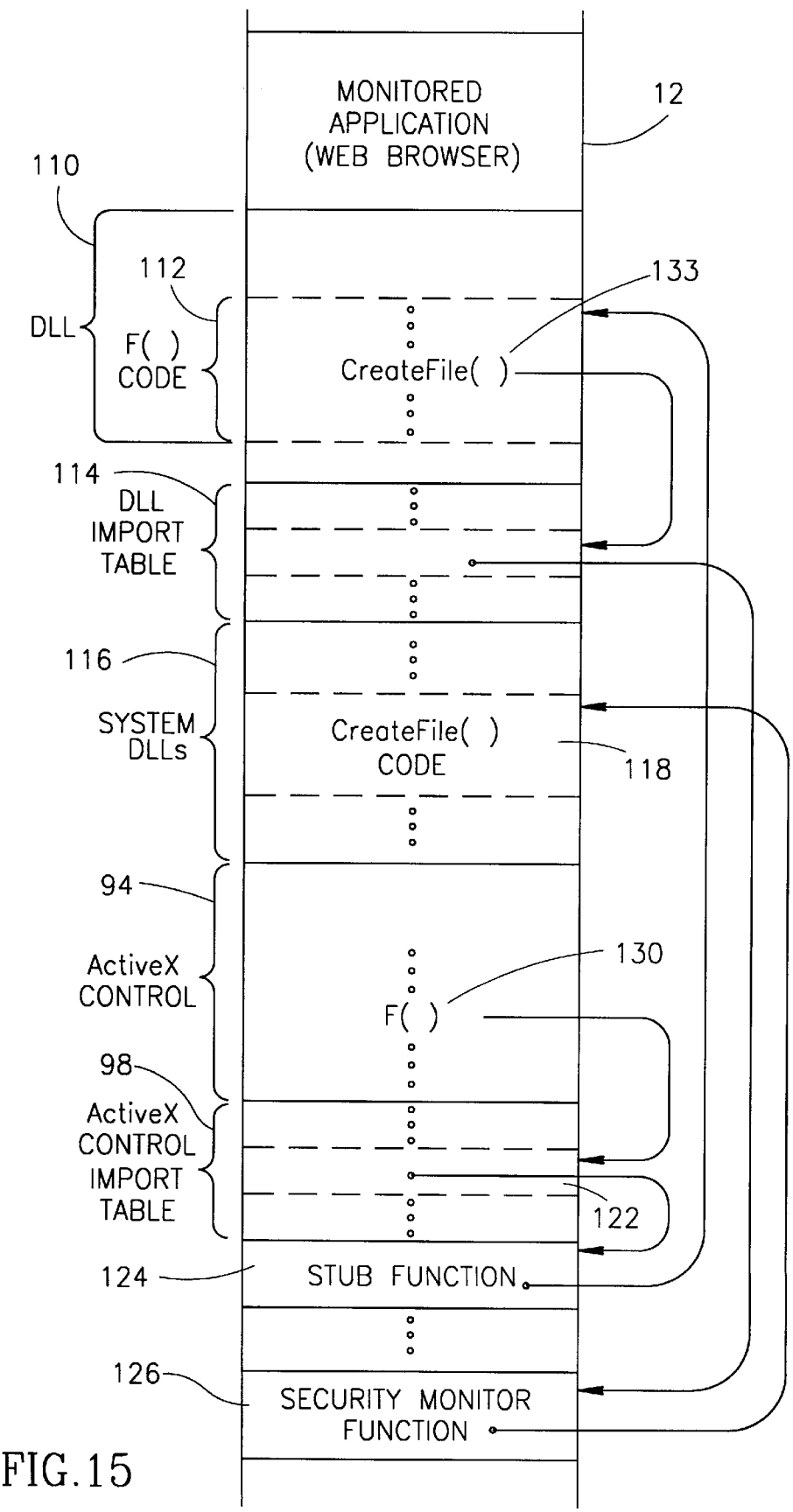
FIG. 15 is a memory representation illustrating the mechanism of a software component indirectly calling a system API using the security monitor of the present invention.

A memory representation illustrating the mechanism of a software component indirectly calling a system API using the security monitor of the present invention is shown in FIG. 15. Shown in the memory map are the monitored application or Web browser 12, a DLL module 110 associated with the Web browser, a function F() 112 within the DLL, the DLL related import data table 114, one or more system DLLs 116, the ActiveX control module 94, the import data table for the ActiveX control 98, stub function 124 and monitor function 126.

Note that the method of the present invention is applicable also to calls made to APIs that are not within the set of preselected APIs. The method is operative to intercept all calls made by the software component, i.e., API calls and non-API calls. The API calls not in the preselected set must still be intercepted since they may call APIs that are in the preselected set later in the call chain.

To illustrate the principles of the method of the present invention, the ActiveX control is shown issuing a call to an arbitrary function F() (FIG. 15 at 130). Calls to other non-API functions are handled in a similar fashion. The actual address of the F() code 112 in the Web browser DLL 110 in the import data table 98 associated with the ActiveX control is replaced with the address of the stub function 124 (FIG. 15 at 122). The address at 122 thus points to the stub function. The stub function, in turn, points to the F() code 112 in the DLL 110. The F() code, in turn, makes a call to the CreateFile API (FIG. 15 at 133).

At the time the ActiveX control is loaded, the stub functions for non-API calls are generated. The address of the original function is read from the import table 98 of the ActiveX control and is known to the stub function. The stub function then calls the function F() 112 in the DLL 110. The function F(), in turn, calls the CreateFile API. Since all APIs from Groups A and B called from the Web browser have previously been redirected by replacing the entries in the DLL import table 114, control passes to the security monitor functions 126 rather than the CreateFile API 118 itself in the system DLL 116. Thus, in this manner, indirect calls made to APIs are also monitored for security breaches.

Thus, when a call to a non-API function is made, control passes to a stub function such as the stub function 124 rather than the non-API function itself The import data table 98 of the ActiveX control is modified so as to point to the stub function (FIG. 15 at 122). Thus, any call made by the ActiveX control to a non-API function is directed to a stub function.

The security monitor of the present invention includes a method of distinguishing between calls made by the ActiveX control from calls made by other modules such as the browser itself The method of distinguishing between calls comprises creating a call chain that originates with a call made by the ActiveX control code to functions that are located in other modules, e.g., function F() (FIG. 15 at 112). These calls are marked in the call chain created so as to indicate that they originated with the ActiveX control. Thus, when a monitored API function call is trapped and intercepted, it can be determined whether the call is part of a call chain that originated from the ActiveX control.

The call chain marking method of marking call chains that originate from the ActiveX control will now be described in more detail. First, in the ActiveX control import data table, all entries are replaced with calls to stub functions that are created on the fly at run time. Thus, any call made by the ActiveX control to any external function is directed to a stub function. The pseudo code for such a stub function is given below:

```
StubFunction()
{
  if (not Is_ActiveX_Control-Chain)
    // call chain was not marked yet as an ActiveX control
    call chain
  {
    // mark the call chain
    Is_ActiveX_Control_Chain=TRUE;
    // store the return address of the calling function
      which is
    // located on the stack
    Original_Return_Point=Get Return_Address();
    // insert a return routine to trap the return from the
      call chain
    Replace_Return_Address_With
      (CommonReturnFunc);
  }
  // call the original function found in the import table
    jump to Original_Function;
}
```

A stub function is generated for each imported function in the ActiveX control at the time it is loaded. The pseudo code for the common return function is identical to that given above.

As described previously, the CommonReturnFunc is common for all stub functions. The common return function resets the call chain marking flag before control returns to the ActiveX control module. This is why the stub function modifies the return address so that when the called function returns, control passes to the common return function and not the ActiveX control. The common return function is responsible for swapping back the original return address within the ActiveX control.

Individual stub functions are generated for each imported function because each stub function needs to contain the address of the actual original non-API function. The stub sets the mark flag if it is not set already, stores the original return address of the calling function, replaces the return address with a return address pointing to the CommonReturnFunc.

The security monitor function 126 is the monitor function of FIG. 14 as described above. The monitor function tests if the Is_ActiveX_Control_Chain flag is set. If the flag is set, then the function call is part of a call chain that originated in the ActiveX control and should be monitored for security breaches. If the flag is not set, it indicates that the function call was issued from the browser code and can be trusted. In this case, the API call is permitted to be made without a security check.

It is important to note that since the monitored application, i.e., the Web browser, operates in a multithreaded environment, global variables to store information should not be used. Global variables should not be used because it is possible for ActiveX controls to run in two separate threads. It is recommended to separately store the state information for each thread. Thus, it is preferable that the following variables be stored on a per thread storage basis. The operating system Thread Local Storage mechanisms can be utilized to accomplish this.

1. Is_ActiveX_Control_Chain—marks a call chain as an ActiveX control call chain.

2. Oringinal_Return_Point—stores the return address of the calling function that initiated an ActiveX control chain.

3. Loading_Control_Flag—signals that an ActiveX control is being loaded.

Special Cases

It is recommended that the following be taken into consideration when implementing the security monitor of the present invention.

GetProcAddress

The API GetProcAddress can be used to obtain the address of any exported function from any module currently loaded into the address space of the process. If such an address is obtained, the function can be called directly, thus bypassing the interception mechanism implemented through the import data tables. In order to prevent any attempt to breach security through a direct call to the function address, the following can be used when the GetProcAddress API function is called and intercepted by its corresponding security monitor function.

```
Monitor_GetProcAddress(module, proc)
{
    if (proc) is an API with no security implication, the
        monitor function does not interfere and permits
        GetProcAddress to return the real address of the API;
    if (proc) is an API with security implications, i.e.,
        included in either Group A or Group B, the monitor
        function returns the address of the monitor function
        corresponding to proc;
    if (proc) is a non-API function from another module,
        the monitor function generates a function stub, in
        order to turn call chain marking on, and returns its
        address;
}
```

This method ensures that any function that is called directly and which has an address that was obtained through the GetProcAddress API function, receives the same treatment as a function that was called through the import data table.

Writing Over Browser Code

Another potential way to stage an attack that may bypass the API interception scheme is to write over the code of the browser itself. If the author of an ActiveX control knows in advance the address in memory of one of the browser's functions, she/he can replace the code at that address with her/his own code. Thus, whenever that particular original browser function is called, the attacking code is executed. This would constitute a major security breach.

To prevent such an attack the following method is performed at the time the ActiveX control is loaded. The security monitor DLL is operative to change the memory protection attribute of the code sections of all existing modules, including browser code and all loaded DLLs, to read and execute only. Thus, the ActiveX control cannot write over the browser code. Further, any attempt to change the protection attribute will be intercepted by the corresponding security monitor interception function and will be prevented.

Security Related APIs

The following APIs are related to security and thus should preferably be intercepted and monitored. If new methods of possible attacks are discovered or new APIs are added to the Windows interfaces, one skilled in the software arts would be able to generate the corresponding interception function.

File Handling APIs
  CopyFile
  CopyFileEx
  CreateDirectory
  CreateDirectoryEx
  CreateFile
  CreateIoCompletionPort
  DefineDosDevice
  DeleteFile
  FindFirstFile
  FindFirstFileEx
  FindNextFile
  GetBinaryType
  GetCompressedFileSize
  GetCurrentDirectory
  GetDiskFreeSpace
  GetDiskFreeSpaceEx
  GetDriveType
  GetFileAttributes
  GetFileAttributesEx
  GetLogicalDrives
  GetLogicalDrivesStrings
  GetVolumeInformation
  MoveFile
  MoveFileEx
  QueryDocDevice
  RemoveDirectory
  SearchPath
  SetCurrentDirectory
  SetEndOfFile
  SetFileAttributes
  SetVolumeLabel
  WriteFile
  WriteFileEx Network Connection APIs The following APIs are part of the Winsock interface and are used in establishing network connections and transmitting information.
  accept
  closesocket
  connect
  listen
  select
  sendto
  setsockopt
  shutdown Registry APIs All registry APIs that modify the system registry are monitored.
  RegCreateKey
  RegCreateKeyEx
  RegDeleteKey
  RegDeleteValue
  RegGetKeySecurity
  RegLoadKey
  RegreplaceKey
  RegRestoreKey
  RegSetKeySecurity
  RegSetValue
  RegSetValueEx
  RegUnLoadKey System Modification APIs The following APIs function to modify the system configuration and are monitored.
  SetComputerName
  SetSysColors Process and Thread APIs The following APIs are used with processes and threads and are monitored in order to prevent unauthorized access to the address space and execution state of other processes and threads running at the same time.
  AttachThreadInput
  CreateProcess
  CreateThread
  CreateProcessAsUser
  CreateRemoteThread
  ExitProcess
  ExitThread
  OpenProcess
  ResumeThread
  SetEnviromenetVariable
  SetPrirityClass
  SetProcessAffinityMask
  SetProcessShutdownParameters
  SetProcessPriorityBoost
  SetProcessProcessWorkingSetSize
  SetThreadPriority
  SetThreadPriorityBoost
  SuspendThread
  TerminateProcess
  TerminateThread E-Mail (MAPI) APIs All the mail Application Programming Interface (MAPI) function APIs are monitored. Note that this assumes that the security profile does not permit untrusted ActiveX controls to access the user's e-mail system.

Telephony (TAPI) APIs

The following Telephony API (TAPI) functions are monitored.

LineOpen
    LineClose
    LineMakeCall
    LineDial
    LineAnswer
    LineSetNumRings
    CallDrop
    LineDrop Miscellaneous APIs SetWindowsHookEx: installs an application defined hook procedure into a hook chain
    ExitWindows: shuts down the system
    ExitWindowsEx: shuts down the system To keep track of known/trusted and unknown/untrusted components, the security monitor maintains a database of known/well behaved or unknown/dangerous software components, i.e., ActiveX controls. The controls are uniquely identified by a combination of electronic authentication, e.g., Microsoft's Authenticode, and a cyclic redundancy check (CRC) of the control's code. The database can be shipped to a user with known, standard well behaved controls in addition to known dangerous one. User may also add to the database by marking executing controls as dangerous or trusted.

While the invention has been described with respect to a limited number of embodiments, it will be appreciated that many variations, modifications and other applications of the invention may be made.

What is claimed is:

1. A method of creating a secure sandbox around both a monitored application and one or more software components associated therewith in accordance with a predetermined security policy, said method comprising the steps of:

intercepting a selected set of application programming interface (API) function calls issued by said monitored application by replacing the addresses of all API functions to be intercepted in an import data table associated with said monitored application with addresses of security monitor functions, each security monitor function associated with a different API function;

intercepting API function calls issued by said software component by replacing the addresses of API functions to be intercepted in an import data table associated with said software component with addresses of sub functions, each stub function operative to call a security monitor function associated with a different API function;

intercepting non-API function calls issued by said software component by replacing the addresses of non-API functions to be intercepted in an import data table associated with said software component with addresses of stub functions, each stub function operative to call a security monitor function associated with a different non-API function;

creating a call chain operative to permit distinguishing between function calls made by said software component from function calls made by said monitored application;

blocking intercepted API calls that are forbidden according to the security policy; and allowing intercepted API calls that are permitted according to the security policy.

2. The method according to claim 1, further comprising the step of injecting a security monitor implementing said secure sandbox into the address space of the monitored application.

3. The method according to claim 1, wherein said step of blocking intercepted API calls comprises the step of preventing the execution of API calls that are in said selected set of API function is which have been determined to have originated by said software component and which have been determined to be forbidden according to the security policy.

4. The method according to claim 1, wherein said step of allowing intercepted API calls comprises the step of allowing intercepted API calls that have been determined to have originated by said monitored application and which are permitted according to the security policy.

5. The method according to claim 1, wherein said software component comprises one of the following: ActiveX control, Java component and Netscape Plugin component.

6. A method of monitoring the execution of an application and one or more software component associated therewith in accordance with a predetermined security policy, said method comprising the steps of:

intercepting a selected set of application programming interface (API) function calls issued by said monitored application by replacing the addresses of all API functions to be intercepted in an import data table associated with said monitored application with addresses of security monitor functions, each security monitor function associated with a different API function;

intercepting API function calls issued by said software component by replacing the addresses of API functions to be intercepted in an import data table associated with said software component with addresses of stub functions, each stub function operative to call a security monitor function associated with a different API function;

intercepting non-API function calls issued by said software component by replacing the addresses of non-API functions to be intercepted in an import data table associated with said software component with addresses of stub functions, each stub function operative to call a security monitor function associated with a different non-API function;

determining whether an intercepted API call issued by said monitored application originated from a non-API call issued by the software component via the generation of a call chain by said software component when a non-API function is called;

blocking intercepted API calls that originated with a non-API call from the software component that are forbidden according to the security policy; and allowing intercepted API calls that originated with a non-API call from the software component that are permitted according to the security policy.

7. The method according to claim 6, further comprising the step of injecting a security monitor into the address space of the monitored application.

8. The method according to claim 6, further comprising the step of injecting a security monitor into the address space of said monitored application, said step of injecting comprising the steps of:

launching said monitored application suspend mode;

allocating memory in the address space of said monitored application;

copying a loading function to said allocated memory;

creating a thread operative to execute said loading function which in turn functions to load said security monitor;

installing means for the interception of application programming interface (API) function calls made by said monitored application and said software component, and non-API function calls made by said software component;

unsuspending said thread and deallocating memory;

unsuspending said monitored application and permitting it to execute.

9. The method according to claim 6, wherein said software component comprises one of the following: ActiveX control, Java component and Netscape Plugin component.

10. A method of monitoring the execution of application and one or more software components associated therewith in accordance with a predetermined security policy, said method comprising the steps of:

injecting a security monitor into the address space of said monitored application;

generating a plurality of stub functions corresponding to application programming interface (API) function calls and non-API function calls which are called by the software component;

redirecting all API calls and all non-API calls made by the software component;

redirecting API calls made by said monitored application to said security monitor;

setting a flag when said software component makes a call to either an API function or a non-API function;

redirecting a portion of API calls received by said plurality of stub functions to said security monitor;

redirecting said non-API calls made by the software component to their corresponding non-API functions; and applying the predetermined security policy to an API call when said flag is set.

11. The method according to claim 10, wherein said software component comprises one of the following: ActiveX control, Java component and Netscape Plugin component.

12. A method of monitoring the execution of an application and one or more software components associated therewith in accordance with a predetermined security policy, said method comprising the steps of:

applying interception to the application including all its modules whether loaded initially or during execution thereof;

detecting the loading of a software component external to the application;

applying interception to all calls made by the software component to functions located in other modules; and applying the security policy to said calls made by the software component.

13. The method according to claim 12, wherein said software component comprises one of the following: ActiveX control, Java component and Netscape Plugin component.

14. A method of monitoring the execution of an application and one or more software components associated therewith in accordance with a predetermined security policy, said method comprising the steps of:

installing means for interception within said monitored application including all modules associated therewith whether loaded initially or during execution thereof;

detecting the loading of a sore component external to said monitored application;

installing means for intercepting to all API and non-API function calls made by the software component to functions located in other modules;

setting a flag when a function call is issued by the software component to any function located in another module located external thereto; and applying the security policy to an API call when said flag is set.

15. The method according to claim 14, wherein said software component comprises one of the following: ActiveX control, Java component and Netscape Plugin component.

16. The method according to claim 14, wherein said step of detecting comprises the step of detecting one of the API functions from the group consisting of CoGetClassObject(), LoadLibrary() and LoadLibraryEx().

17. A method of creating a secure sandbox around both a monitored application and one or more software components associated therewith in accordance with a predetermined security policy, said method comprising the steps of:

intercepting a selected set of application programming interface (API) function calls issued by said monitored application by replacing the addresses of all API functions to be intercepted in an import data table associated with said monitored application with addresses of security monitor functions, each security monitor function associated with a different API function;

detecting a load API function call issued by said monitored application;

blocking intercepted API calls that are forbidden according to the security policy; and allowing intercepted API calls that are permitted according to the security policy.

18. The method according to claim 17, wherein said load type API function call comprises one API function call from the group consisting of CoGetClassObject(), LoadLibrary() and LoadLibraryEx().

19. The method according to claim 17, further comprising the steps of:

upon detention of a load type API function call;

intercepting API function calls issued by said software component by replacing the addresses of API functions to be intercepted an import data table associated with said software component with addresses of stub functions each stub function operative to call a security monitor function associated with a different API function;

intercepting non-API function calls issued by said software component by replacing the addresses of non-API functions to be intercepted in an import data table associated with said software component with addresses of stub functions, each stub function operative to call a security monitor function associated with a different non-API function; and creating a call chain operative to permit distinguishing between function calls made by said software component from function calls made by said monitored application.

* * * * *